United States Patent [19]

Janssen

[11] Patent Number: 4,965,026

[45] Date of Patent: Oct. 23, 1990

[54] PROCESS FOR HYDROXYLATING HYDROPHOBIC POLYMER SURFACES

[75] Inventor: Robert A. Janssen, Alpharetta, Ga.

[73] Assignee: Ciba-Geigy Corporation, Ardsley, N.Y.

[21] Appl. No.: 297,020

[22] Filed: Jan. 13, 1989

[51] Int. Cl.$^5$ .................. C08J 7/12; B29D 11/00; B29C 71/04

[52] U.S. Cl. ........................ 264/22; 264/1.4; 264/2.6; 264/25; 264/78; 264/83

[58] Field of Search ............... 264/1.4, 1.7, 2.6, 25, 264/78, 83

[56] References Cited

U.S. PATENT DOCUMENTS

| | | | |
|---|---|---|---|
| 3,008,920 | 11/1961 | Urchick | 525/244 |
| 3,070,573 | 12/1962 | Beck | 525/245 |
| 3,677,877 | 7/1972 | Meteria et al. | 264/2.6 |
| 3,925,178 | 12/1975 | Gesser | 264/1.4 |
| 4,311,573 | 1/1982 | Mayhan et al. | 204/159.15 |
| 4,589,964 | 5/1986 | Mayhan et al. | 522/85 |
| 4,761,436 | 8/1988 | Kohns | 264/2.6 |

FOREIGN PATENT DOCUMENTS

| | | | |
|---|---|---|---|
| 2748568 | 5/1979 | Fed. Rep. of Germany | 1/1.4 |
| 50336 | 3/1987 | Japan | 264/2.6 |

*Primary Examiner*—James Lowe
*Attorney, Agent, or Firm*—Luther A. R. Hall

[57] ABSTRACT

A process for treating hydrophobic polymer surfaces to form hydroxyl moieties thereon comprises ozonating the surface of said hydrophobic polymer to form hydroperoxy groups thereon, and then irradiating said ozonated surface with ultraviolet light or exposing to heat to convert the hydroperoxy groups to hydroxyl moieties in the presence of a hydrogen donor. Such hydroxylated surfaces possess hydrophilic properties and can undergo the chemical reactions characteristic for hydroxyl groups. Polymers so modified are useful in biomedical devices, semipermeable membranes, films, fibers and especially contact lenses.

7 Claims, No Drawings

PROCESS FOR HYDROXYLATING HYDROPHOBIC POLYMER SURFACES

This invention is to a process for treating hydrophobic polymer surfaces to form hydroxyl groups thereon by ozonating said surface and then irradiating the ozonated surface with ultraviolet light or exposing to heat to form hydroxyl moieties on said surfaces, and to the products made by said process.

BACKGROUND OF THE INVENTION

Graft polymerization per se has long been known in the art with many graft copolymers such as ABS (acrylonitrile butadiene/styrene) resins achieving considerable commercial success.

It has also been known in the art that various vinylic monomers can be graft polymerized onto polymer substrates which have been first treated with ionizing radiation in the presence of oxygen or with ozone to form peroxy groups on the surface of said substrate. U.S. Pat. Nos. 3,008,920 and 3,070,573 teach the grafting of selected monomers onto ozonated polymer substrates.

While such a process would in theory seem to be a panacean method to modify at will the surface characteristics of any polymer substrate, such is not the case as is seen in the teachings of U.S. Pat. Nos. 4,311,573 and 4,589,964.

The objective of such graft polymerization is to modify the surface of the polymer substrate without causing major changes in the physical characteristics of the substrate as a whole.

Problems have arisen when such a graft polymerization process is carried out. One serious complication involves graft polymerization of the vinylic monomer onto the substrate as desired, but with the simultaneous and undesired homopolymerization of the vinylic monomer. This problem can be minimized by carrying out the graft polymerization process in the presence of a metal redox system using a variable valence metal ion in the reduced state to convert any hydroxyl free radical present to hydroxyl ion and thus minimize the simultaneous homopolymerization problem. See U.S. Pat. Nos. 3,008,920, 4,311,573 and 4,589,964.

U.S. Pat. Nos. 4,311,573 and 4,589,964 teach that another problem encountered in the surface grafting of a preformed polymeric substrate concerns depth and density control of the graft. If the bulk properties of the substrate are to be retained, then the graft depth should be no greater than necessary to modify the surface characteristics of the article. Grafts of excessive depth, grafts of insufficient density to achieve the desired property modification and the swelling and degradation of the substrate article during the process are serious problems plaguing this panacean process.

U.S. Pat. Nos. 4,311,573 and 4,589,964 teach a method aimed at inhibiting homopolymerization, at controlling graft depth and at accelerating graft polymerization to increase density, namely by carrying out the graft polymerization in the presence of a variable metal ion (ferrous) and a complexing agent (squaric acid) to control mobility of said ions.

OBJECTS OF THE INVENTION

One object of this invention is to provide a facile process for hydroxylating the surface of a hydrophobic polymer to form hydroxyl groups thereon.

Another object of this invention is to prepare contact lenses, biomedical devices or other useful materials by the process of this invention.

DETAILED DISCLOSURE

The instant invention is to a process for treating the surface of a hydrophobic polymer such as a polysiloxane to form hydroxyl groups thereon which comprises ozonating the polymer surface to form peroxy and hydroperoxy groups thereon, and then exposing the ozonated surface to ultraviolet light or heat to convert the peroxy and hydroperoxy groups to hydroxyl moieties in the presence of a hydrogen donor.

The hydrophobic polymer which can be used in this process can be fabricated in any convenient form, such as a film, fiber, pellicle, device or object including contact lenses, whose surface would benefit by the presence of hydroxyl groups to impart hydrophilicity and/or ancillary properties, such as dyeability or tinting, resulting from some subsequent chemical reaction with the hydroxyl groups formed on the polymer surface.

The hydrophobic polymer useful in the instant invention must itself have a hydrocarbon group somewhere in its structure making it amenable to peroxidation and hydroperoxydation when exposed to ozone to form peroxy and hydroperoxy groups on the hydrophobic polymer surface.

Polymeric materials useful in this instant invention include inter alia polyolefins, polyesters, polyamides, cellulosics, polyurethanes, hydrophobic polysiloxanes, polymers containing poly(alkylene oxide) units, polycarbonates, silicone rubber, natural and synthetic rubber, epoxy resins, polyvinyl chloride, polystyrene, poly(methyl methacrylate) and copolymers and the like.

The peroxy and hydroperoxy groups are conveniently introduced onto the surface of the hydrophobic polymer by subjecting said surface to ozone ($O_3$). This can be done by appropriately suspending, placing or otherwise fixing the hydrophobic polymer in a chamber or vessel so that the surfaces to be modified will be intimately contacted with ozone in a gaseous carrier such as ozonated air or ozonated oxygen or with ozone dissolved in a perhalogenated solvent for a period of time sufficient to result in the requisite uptake of ozone onto the polymer surface to form the desired peroxy and hydroperoxy groups. Generally this time required is less than one hour, usually about 30 minutes.

The reaction temperature is generally not critical, and the reaction can be conducted over a wide temperature range from between 0° and 100° C. For convenience ambient temperatures are preferred.

In order to facilitate the reaction between the hydrophobic polymer and ozone to form the hydroperoxidized surface, it is preferable for the reaction to be carried out in the presence of a small amount of moisture.

Ozone can be conveniently prepared in admixture with a carrier gas by passing an oxygen containing gas, such as air or pure oxygen, through a standard ozone generator. In the case of air, about 2% ozone by weight is generally produced. In the case of pure oxygen, about 4% ozone by weight is characteristically produced.

The ozone prepared by the ozone generator can also be dissolved in a perhalogenated solvent such as inter alia carbon tetrachloride, 1,1,2-trichloro-1,2,2-trifluoroethane, octafluorocyclobutane, perfluorohexane, perfluoroheptane, perfluoro-(1,3-dimethylcyclohexane), perfluorocyclohexane, 1,1,1-trichloro-2,2,2-trifluoroethane, 1,1,1,2-tetrachloro2,2-difluoroethane and 1,1,2,2-tetrachloro-1,2-difluoroethane. Preferably carbon tetrachloride, perfluoro-(1,3dimethylcyclohexane), 1,1,2-trichloro-1,2,2-trifluoroethane or perfluorohexane is the perhalogenated solvent of choice.

Another aspect of the instant invention is the ozonation of polysiloxane polymer substrates, particularly contact lenses, in the presence of a perhalogenated hydrocarbon liquid, particularly 1,1,2-trichloro-1,2,2-trifluoroethane. Polysiloxane contact lenses have high surface tack making them stick together when ozonated in gaseous or in aqueous media causing irreparable damage to said lenses when their separation is attempted.

The polysiloxane swells in the perhalogenated hydrocarbon liquid and ozone is highly soluble in said liquid leading to a large (up to 13 times) increase in peroxy and hydroperoxy sites, compared to ozonation in water, on the surface of the polysiloxane lenses suitable for later conversion to hydroxyl groups.

Following the exposure of the preformed polymeric substrate to ozone in some gaseous or liquid medium, the ozonated substrate is allowed to air dry at ambient temperature to eliminate any residual ozone. While ozonation has occurred primarily at sites on the exposed surfaces, some peroxidized and hydroperoxidized groups may also be present in any adventitious internal intertices or recesses available to the ozone.

Since the ozonated substrate contains peroxy and hydroperoxy groups which are unstable when raised to elevated temperatures, the ozonated substrate can be kept for long periods of time (several months) a low temperature (0° to 20° C) in an atmosphere of nitrogen without loss of the peroxy and hydroperoxy groups.

The ozonated sample is brought in contact or saturated with a suitable hydrogen donor and is then exposed to ultraviolet light or heated at elevated temperature for a period sufficient to convert the ozonated surface to form hydroxyl groups.

The hydrogen donor is a lower alkanol of 1 to 5 carbon atoms, such as ethanol, isopropanol, n-butanol or isoamyl alcohol, but is preferably water.

The ultraviolet light source is any commercially available UV lamps, such as low pressure mercury arc lamps, giving off radiation in the UV region of 290–400 nm.

The polysiloxane contact lenses which have been treated by the instant process to form hydroxyl groups on their surface have greatly increased hydrophilicity making them sufficiently hydrophilic to be acceptable for use on the eye.

That the original hydrophobic polymer surface now has hydroxyl groups thereon after undergoing the instant process can be easily demonstrated when tinting of said treated lens is carried out using a reactive dye as taught in U.S. Pat. No. 4,468,229. A hydroxyl group is needed on the polymer for tinting to occur as it does when the treated polysiloxane contact lenses are tinted with a reactive dye.

The following examples are presented for the purpose of illustration only and are not to be construed to limit the nature or scope of the instant invention in any manner whatsoever.

EXAMPLE 1

Ozonation of Polysiloxane (Hydroperoxide Yield)

To determine the relative ozonation rates of polysiloxane film in water as compared to perhalogenated hydrocarbons, separate samples of the same polysiloxane film are placed in water and in 1,1,2-trichloro-1,2,2-trifluoroethane (FREON TF or 113) into which ozone, prepared in a standard ozone generator, is passed at room temperature for 30 minutes. The solubility of ozone in water is 4.5 ppm while in FREON TF or 113 is 491 ppm.

The samples of polysiloxane films in the water system clump together very quickly. Analysis of hydroperoxide content (iodometric titration method) in said films shows 0.924 mg/g or a 0.09% hydroperoxide content.

The samples of polysiloxane film ozonated in the Freon TF or 113 system stay separate and analysis of hydroperoxide content on said films shows 12 mg/g or a 1.2% hydroperoxide content.

Clearly ozonation of substrate materials in the FREON system leads to higher hydroperoxide contents in the substrate materials after ozonation.

EXAMPLE 2

Polysiloxane contact lenses are ozonated for 15 minutes by contact with ozone in air or ozone dissolved in 1,1,2-trichloro-1,2,2-trifluoroethane (FREON 113) to ozonate the surface of said lenses at ambient temperature.

The ozonated lenses are then air-dried and brought in contact with or saturated with water or with isopropanol. The lenses in the presence of the hydrogen donor liquid are exposed to ultraviolet radiation with a UV lamp for 30 minutes to convert the peroxy and hydroperoxy groups to hydroxyl moieties.

The treated polysiloxane contact lenses have hydroxyl groups on their surface and exhibit hydrophilic properties.

EXAMPLE 3

Tinting of Treated Polysiloxane Contact Lenses

Four polysiloxane contact lenses are placed in 50 ml of water. Ozone, prepared in a standard ozone generator, is bubbled through the water system for 150 minutes at ambient temperature to ozonate the lenses.

The lenses are then rinsed with deionized water, purged with nitrogen and irradiated by ultraviolet light for 30 minutes in the presence of water to convert the peroxy and hydroperoxy groups to hydroxyl moieties.

The treated lenses are then tinted according to the directions of Example 2 of U.S. Pat. No. 4,468,229 to an aquamarine color with a dye reactive with hydroxyl groups.

Polysiloxane contact lenses which have not been treated according to the instant invention do not tint indicating that polysiloxane has normally no hydroxyl moieties on the surface.

By contrast the treated polysiloxane lenses do have hydroxyl groups on the surface allowing them to be tinted with the reactive dye described in U.S. Pat. No. 4,468,229.

What is claimed is:

1. A process for treating the surface of a hydrophobic polymer to form hydroxyl groups thereon which comprises ozonating the polymer surface to form peroxy and hydroperoxy groups thereon, and then exposing the ozonated surface to ultraviolet light or heat to convert the peroxy and hydroperoxy groups to hydroxyl moieties in the presence of a hydrogen donor.

2. A process according to claim 1 wherein the hydrophobic polymer is a polysiloxane.

3. A process according to claim 1 wherein the ozonation is carried out in water, air, oxygen or a perhalogenated hydrocarbon medium.

4. A process according to claim 3 wherein the ozonation is carried out in a perhalogenated hydrocarbon medium.

5. A process according to claim 4 wherein the perhalogenated hydrocarbon medium is carbon tetrachloride, 1,1,2-trichloro-1,2,2-trifluoroethane, perfluorohexane or perfluoro-(1,3-dimethylcyclohexane).

6. A process according to claim 1 wherein the hydrogen donor is an alkanol of 1 to 5 carbon atoms or water.

7. A process according to claim 6 wherein the hydrogen donor is water.

* * * * *